(12) United States Patent
Dowski, Jr.

(10) Patent No.: US 7,554,732 B2
(45) Date of Patent: *Jun. 30, 2009

(54) WAVEFRONT CODED IMAGING SYSTEMS

(75) Inventor: Edward Raymond Dowski, Jr., Lafayette, CO (US)

(73) Assignee: OmniVision CDM Optics, Inc., Boulder, CO (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/511,023

(22) Filed: Aug. 28, 2006

(65) Prior Publication Data

US 2007/0076296 A1 Apr. 5, 2007

Related U.S. Application Data

(63) Continuation of application No. 11/192,572, filed on Jul. 29, 2005, now Pat. No. 7,106,510, which is a continuation of application No. 10/407,708, filed on Apr. 4, 2003, now Pat. No. 6,940,649, which is a continuation of application No. 09/747,788, filed on Dec. 22, 2000, now abandoned, application No. 11/511,023, which is a continuation-in-part of application No. 09/070,969, filed on May 1, 1998, now Pat. No. 7,218,448, which is a continuation-in-part of application No. 08/823,894, filed on Mar. 17, 1997, now Pat. No. 5,748,371, which is a continuation of application No. 08/384,257, filed on Feb. 3, 1995, now abandoned.

(51) Int. Cl.
*G02B 5/18* (2006.01)

(52) U.S. Cl. .................. 359/558; 359/559; 359/563; 359/11

(58) Field of Classification Search ................ None
See application file for complete search history.

(56) References Cited

U.S. PATENT DOCUMENTS 2,959,105 A 11/1960 Sayanagi (Continued)

FOREIGN PATENT DOCUMENTS

EP 0531926 3/1993

(Continued)

OTHER PUBLICATIONS

Bradburn, S, et al., Realizations of Focus Invariance in Optical/Digital Systems with Wavefront Coding, Imaging Systems Laboratory, Optoelectronic Computing Systems Center, University of Colorado, Department of Electrical and Computer Engineering, 1997, 22 pages.

(Continued)

*Primary Examiner*—Joshua L Pritchett
(74) *Attorney, Agent, or Firm*—Lathrop & Gage LLP

(57) ABSTRACT

A singlet imaging system for imaging an object onto a detector includes a lens configured for producing transverse ray intercept curves which are substantially straight, sloped lines. A wavefront coding element is formed on a surface of the lens and configured such that a modulation transfer function of the lens and wavefront coding element, combined, exhibits reduced variation, over a range of spatial frequencies and caused, at least in part, by aberrations of the lens, as compared to a modulation transfer function of the lens alone, without the wavefront coding element. A post processor is configured for generating an improved modulation transfer function, over the range of spatial frequencies, as compared to the modulation transfer function of the lens and the wavefront coding element.

18 Claims, 18 Drawing Sheets

U.S. PATENT DOCUMENTS

| | | |
|---|---|---|
| 3,054,898 A | 9/1962 | Westover et al. |
| 3,305,294 A | 2/1967 | Alvarez |
| 3,583,790 A | 6/1971 | Baker |
| 3,614,310 A | 10/1971 | Korpel |
| 3,856,400 A | 12/1974 | Hartmann et al. |
| 3,873,958 A | 3/1975 | Whitehouse |
| 4,062,619 A | 12/1977 | Hoffman |
| 4,082,431 A | 4/1978 | Ward, III |
| 4,174,885 A | 11/1979 | Joseph et al. |
| 4,178,090 A | 12/1979 | Marks et al. |
| 4,255,014 A | 3/1981 | Ellis |
| 4,275,454 A | 6/1981 | Klooster, Jr. |
| 4,276,620 A | 6/1981 | Kahn et al. |
| 4,308,521 A | 12/1981 | Casasent et al. |
| 4,349,277 A | 9/1982 | Mundy et al. |
| 4,466,067 A | 8/1984 | Fontana |
| 4,480,896 A | 11/1984 | Kubo et al. |
| 4,573,191 A | 2/1986 | Kidode et al. |
| 4,575,193 A | 3/1986 | Greivenkamp, Jr. |
| 4,580,882 A | 4/1986 | Nuchman et al. |
| 4,589,770 A | 5/1986 | Jones et al. |
| 4,642,112 A | 2/1987 | Freeman |
| 4,650,292 A | 3/1987 | Baker et al. |
| 4,655,565 A | 4/1987 | Freeman |
| 4,725,881 A | 2/1988 | Buchwald |
| 4,734,702 A | 3/1988 | Kaplan |
| 4,794,550 A | 12/1988 | Greivenkamp, Jr. |
| 4,804,249 A | 2/1989 | Reynolds et al. |
| 4,825,263 A | 4/1989 | Desjardins et al. |
| 4,827,125 A | 5/1989 | Goldstein |
| 4,843,631 A | 6/1989 | Steinpichler et al. |
| 4,936,661 A | 6/1990 | Betensky et al. |
| 4,964,707 A | 10/1990 | Hayashi |
| 4,989,959 A | 2/1991 | Plummer |
| 5,003,166 A | 3/1991 | Girod |
| 5,076,687 A | 12/1991 | Adelson |
| 5,102,223 A | 4/1992 | Uesugi et al. |
| 5,128,874 A | 7/1992 | Bhanu et al. |
| 5,142,413 A | 8/1992 | Kelly |
| 5,165,063 A | 11/1992 | Strater et al. |
| 5,166,818 A | 11/1992 | Chase et al. |
| 5,193,124 A | 3/1993 | Subbarao |
| 5,218,471 A | 6/1993 | Swanson et al. |
| 5,243,351 A | 9/1993 | Rafanelli et al. |
| 5,248,876 A | 9/1993 | Kerstens et al. |
| 5,260,727 A | 11/1993 | Oksman et al. |
| 5,270,825 A | 12/1993 | Takasugi et al. |
| 5,270,861 A | 12/1993 | Estelle |
| 5,270,867 A | 12/1993 | Estelle |
| 5,280,388 A | 1/1994 | Okayama et al. |
| 5,299,275 A | 3/1994 | Jackson et al. |
| 5,301,241 A | 4/1994 | Kirk |
| 5,307,175 A | 4/1994 | Seachman |
| 5,317,394 A | 5/1994 | Hale et al. |
| 5,337,181 A | 8/1994 | Kelly |
| 5,426,521 A | 6/1995 | Chen et al. |
| 5,438,366 A | 8/1995 | Jackson et al. |
| 5,442,394 A | 8/1995 | Lee |
| 5,444,574 A | 8/1995 | Ono et al. |
| 5,465,147 A | 11/1995 | Swanson |
| 5,473,473 A | 12/1995 | Estelle et al. |
| 5,476,515 A | 12/1995 | Kelman et al. |
| 5,521,695 A | 5/1996 | Cathey, Jr. et al. |
| 5,532,742 A | 7/1996 | Kusaka et al. |
| 5,555,129 A | 9/1996 | Konno et al. |
| 5,565,668 A | 10/1996 | Reddersen et al. |
| 5,568,197 A | 10/1996 | Hamano |
| 5,572,359 A | 11/1996 | Otaki et al. |
| 5,610,684 A | 3/1997 | Shiraishi |
| 5,640,206 A | 6/1997 | Kinoshita et al. |
| 5,706,139 A | 1/1998 | Kelly |
| 5,748,371 A | 5/1998 | Cathey, Jr. et al. |
| 5,751,475 A | 5/1998 | Ishiwata et al. |
| 5,756,981 A | 5/1998 | Roustaei et al. |
| 5,969,853 A | 10/1999 | Takaoka |
| 5,969,855 A | 10/1999 | Ishiwata et al. |
| 6,021,005 A | 2/2000 | Cathey, Jr. et al. |
| 6,025,873 A | 2/2000 | Nishioka et al. |
| 6,034,814 A | 3/2000 | Otaki |
| 6,037,579 A | 3/2000 | Chan et al. |
| 6,069,738 A | 5/2000 | Cathey, Jr. et al. |
| 6,091,548 A | 7/2000 | Chen |
| 6,097,856 A | 8/2000 | Hammond, Jr. |
| 6,121,603 A | 9/2000 | Hang et al. |
| 6,128,127 A | 10/2000 | Kusaka |
| 6,133,986 A | 10/2000 | Johnson |
| 6,144,493 A | 11/2000 | Okuyama et al. |
| 6,172,723 B1 | 1/2001 | Inoue et al. |
| 6,172,799 B1 | 1/2001 | Raj |
| 6,208,451 B1 | 3/2001 | Itoh |
| 6,218,679 B1 | 4/2001 | Takahara et al. |
| 6,219,113 B1 | 4/2001 | Takahara |
| 6,248,988 B1 | 6/2001 | Krantz |
| 6,285,345 B1 | 9/2001 | Crossland et al. |
| 6,288,382 B1 | 9/2001 | Ishihara |
| 6,337,472 B1 | 1/2002 | Garner et al. |
| 6,525,302 B2 | 2/2003 | Dowski et al. |
| 6,536,898 B1 | 3/2003 | Cathey et al. |
| 6,873,733 B2 | 3/2005 | Dowski, Jr. |
| 6,940,649 B2 | 9/2005 | Dowski, Jr. |
| 2003/0173502 A1 | 9/2003 | Dowski et al. |
| 2004/0145808 A1 | 7/2004 | Cathey et al. |
| 2005/0264886 A1 | 12/2005 | Dowski, Jr. |

FOREIGN PATENT DOCUMENTS

| | | |
|---|---|---|
| EP | 0584769 | 3/1994 |
| EP | 0618473 | 10/1994 |
| EP | 0742466 | 11/1996 |
| EP | 0759573 | 2/1997 |
| EP | 0791846 | 8/1997 |
| EP | 0981245 | 1/2006 |
| GB | 2278750 | 12/1994 |
| JP | 2000-98301 | 4/2000 |
| WO | WO 96/24085 | 8/1996 |
| WO | WO 99/57599 | 11/1999 |
| WO | WO 00/52513 | 9/2000 |
| WO | WO 02/052331 A2 | 7/2002 |

OTHER PUBLICATIONS

Cathey W.T. & Dowski E.R., A New Paradigm for Imaging Systems, University of Colorado and CDM Optics, Inc., 2001, 4 pages.

Dowski et al., Wavefront Coding: jointly optimized optical and digital imaging systems, Aerosense II, IR Imaging, 2000, CDM Optics, 7 pages.

Dowski, E.R., Cathey, W.T., Control of Aberrations in Optical/Digital Imaging Systems, CDM Optics and University of Colorado respectively, 1998, 11 pages.

Dowski, E. & Johnson, G., Wavefront Coding™, CDM Optics, Inc., 1999, 43 pages.

Dowski, E.R. & Cathey, W.T., Extended Depth of Focus and Aberration Control, University of Colorado, Department of Electrical and Computer Engineering, 2001, 3 pages.

Dowski, E.R. & Johnson, G.E., Wavefront Coding: A Modern Method of Achieving High Performance and/or Low Cost Imaging Systems, CDM Optics, Inc., Presented at SPIE Annual Meeting, Denver, CO, Aug. 1999, 9 pages.

Dowski, E.R., A New Optics Paradigm: Generalized Aspheric Optics with Specialized Digital Post Processing, CDM Optics, Inc., 1999, 30 pages.

Fitzgerrell, A.R., et al., Defocus transfer function for circularly symmetric pupils, Applied Optics, vol. 36, No. 23, Aug. 10, 1997, pp. 5796-5804.

Prischepa, I. A. & Dowski, E.R., Wavefront Coding Optical System Design, CDM Optics, Inc., Integrated Computational Imaging Systems (ICIS) 2001 paper, 6 pages.
Prischepa, I.A., Dowski, E.R., Wavefront Coded Zoom Lens System, CDM Optics, Inc., 2001, Proceedings of SPIE vol. 4487, 11 pages.
Wach, Hans B., et al.; Control of Chromatic Aberration Through Wave-front Coding, University of Colorado, Imaging Systems Laboratory, 1997, 13 pages.
Patent Abstracts of Japan; JP200033076; Asahi Optical.
U.S. Appl. No. 09/875,766 Office Action dated Jul. 31, 2002; 11 pages.
U.S. Appl. No. 09/070,969 Selected pages from Image File Wrapper, Nov. 20, 1998 through May 21, 2008, 503 pages.
U.S. Appl. No. 10/355,761 Selected pages from Image File Wrapper, Feb. 23, 2005 through Jul. 3, 2007, 59 pages.
U.S. Appl. No. 10/364,552 Selected pages from Image File Wrapper, Feb. 24, 2003 through May 3, 2005, 64 pages.
U.S. Appl. No. 10/407,708 Selected pages from Image File Wrapper, Jul. 14, 2003 through Jun. 13, 2005, 74 pages.
U.S. Appl. No. 10/758,740 Selected pages from Image File Wrapper, Nov. 5, 2004 through Jun. 12, 2008, 417 pages.
U.S. Appl. No. 11/192,572 Selected pages from Image File Wrapper; Oct. 6, 2005 through Aug. 21, 2007, 61 pages.
PCT/US01/44159 International Search Report, Aug. 1, 2002; 3 pages.
PCT/US01/44159 International Preliminary Examination Report, Apr. 29, 2003; 6 pages.
European Application No. EP01272457.1; selected pages from File History, Jul. 22, 2003 through Sep. 15, 2006; 25 pages.
PCT/US99/09546 International Search Report mailed Sep. 20, 1999; 3 pages.
U.S. Appl. No. 09/910,675 Letter to Examiner filed Dec. 11, 2001; 2 pages.
U.S. Appl. No. 09/910,675 Office Action mailed Sep. 11, 2002; 12 pages.
U.S. Appl. No. 09/910,675 Response to Office Action filed Feb. 11, 2003; 2 pages.
U.S. Appl. No. 09/610,675 Notice of Abandonment mailed May 9, 2003; 2 pages.
U.S. Appl. No. 08/384,257 Office Action mailed May 17, 1996; 8 pages.
U.S. Appl. No. 08/384,257 Response to Office Action filed Sep. 13, 1996; 29 pages.
U.S. Appl. No. 08/384,257 Interview Summary mailed Dec. 4, 1996; 8 pages.
U.S. Appl. No. 08/384,257 Notice of Allowance mailed Dec. 17, 1996; 1 page.
U.S. Appl. No. 08/834,257 Notice of Abandonment mailed Jun. 6, 1997; 1 page.
Abstract of JP 60247611 A, published Jul. 12, 1985 (Toshiba KK), Patent Abstract of Japan, May 6, 1986, vol. 010, No. 119 (p-435), 1 page.
Barnard, K. J., et al. "Nonmechanical microscanning using optical space-fed phased arrays", Optical Engineering, vol. 33, No. 9, p. 3063-3071, Sep. 1994.
Bartelt, J., et al., "Misfocus tolerance seen by simple inspection of the ambiguity function", Applied Optics, vol. 23, No. 16, p. 2693-2696, Aug. 15, 1984.
Cathey, W. T. et al., "Image gathering and processing for enhanced resolution", J. Opt. Soc. Am. A, vol. 1, No. 3, p. 241-250, Mar. 1984.
Cathey, W.T. & Davis, W.C. "Imaging system with range to each pixel", J Opt. Soc. Am A, vol. 3, No. 9, p. 1537-1542, Sep. 1986.
Chen, Q.S. & Weinhous, M.S. "Sub-pixel shift with fourier transformation to achieve efficient and high quality image interpolation", SPIE, vol. 2, No. 3661, p. 728-736, Feb. 1999.
Chi, W. & George, N., "Electronic imaging using a logarithmic asphere", Optics Letters, vol. 26, No. 12, p. 875-877, Jun. 15, 2001.
Cogswell C.J. & Sheppard, C.J.R. "Confocal differential interference contrast (DIC) microscopy: including a theoretical analysis of conventional and confocal DIC imaging", Journal of Microscopy, vol. 165, part 1, p. 81-101, Jan. 1992.
Cogswell, C.J. et al. "Quantitative DIC microscopy using a geometric phase shifter", SPIE, vol. 2984, p. 72-81, 1997.

Dowski, E.R. Jr, & Cathey, W.T. "Extended depth of field through wave-front coding", Applied Optics, vol. 34, No. 11, p. 1859-1866, Apr. 10, 1995.
Dowski, E.R. Jr., & Cathey, W.T. "Single lens single-image incoherent passive-ranging systems", Applied Optics, vol. 33, No. 29, p. 6762-6773, Oct. 10, 1994.
Fukano, T. "Geometrical cross-sectional imaging by a heterodyne wavelength-scanning interference confocal microscope", Optics Letters, vol. 25, No. 8, p. 548-550, Apr. 15, 2000.
Grievenkamp, J. E. "Color dependent optical prefilter for the suppression of aliasing artifacts", Applied Optics, vol. 29, No. 5, p. 676-684, Feb. 10, 1990.
Hausler, G., "A method to increase the depth of focus by two step image processing", Optical Communications, vol. 6, No. 1, p. 38-42, Sep. 1972.
Hausler, G., and E. Korner, "Imaging with expanded depth of focus", Zeiss Inform, Oberkochen, 29, No. 98E, p. 9-13 (1986/1987).
Hecht, E., Optics, Second Edition, 1987, pp. 177-181.
Indebetouw, G. & Bai, H. "Imaging with Fresnel zone pupil masks: extended depth of field", Applied Optics, vol. 23, No. 23, p. 4299-4302, Dec. 1, 1984.
International Search Report received in PCT/US01/26126, international filing date Aug. 20, 2001, Completion Date Jun. 24, 2003, 3 pages.
Johnson, G. E. et al. "Passive ranging through wave-front coding: information and application", Applied Optics, vol. 39, No. 11, p. 1700-1710, Apr. 10, 2000.
Kawakita, M., et al. "Axi-version camera: a three-dimension camera", In Three-dimensional Image Capture and Applications III, Brian D. Corner, Joseph H. Nurre, Editors, Proceedings of SPIE, vol. 3958, p. 61-70, 2000.
Kermisch, D. "Partially coherent image processing by laser scanning", Journal of the Optical Society of America, vol. 65, No. 8, p. 887-891, Aug. 1975.
Kermisch, D. "Principle of equivalence between scanning and conventional optical imaging systems", J. Opt. Soc. Am, vol. 67, No. 10, p. 1357-1360, Oct. 1977.
Kubo, S. et al. "Preferred sharpness of photographic color images", Journal of Imaging Science, vol. 29, No. 6, p. 213-215, Nov./Dec. 1985.
Marks, D.L., et al. "Three-dimensional tomography using a cubic-phase plate extended depth-of-field system", Optics Letters, vol. 24, No. 4, p. 253-255, Feb. 15, 1999.
McCrickerd, J.T. "Coherent processing and depth of focus of annular aperture imagery", Applied Optics, vol. 10, No. 10, p. 2226-2230, Oct. 1971.
Mino, M. & Okano, Y. "Improvement in the OTF of a defocused optical system through the use of shade apertures", Applied Optics, vol. 10, No. 10, p. 2219-2225, Oct. 1971.
Ojeda-Castaneda, J. & Berriel-Valdos, L.R. "Zone plate for arbitrarily high focal depth", Applied Optics, vol. 29, No. 7, p. 994-997, Mar. 1, 1990.
Ojeda-Castaneda, J., & Diaz, A. "High focal depth by quasibifocus", vol. 27, No. 20, p. 4163-4165, Oct. 15, 1988.
Ojeda-Castaneda, J., & Berriel-Valdos, L.R. "Arbitrarily high focal depth with finite apertures", Optics Letters, vol. 13, No. 3, p. 183-185, Mar. 1988.
Ojeda-Castaneda, J., et al. "Arbitrarily high focal depth with a quasioptimum real and positive transmittance apodizer", Applied Optics, vol. 28, No. 13, p. 2666-2670, Jul. 1, 1989.
Ojeda-Castaneda, J., et al., "Ambiguity function as a design tool for high focal depth", Applied Optics, vol. 27, No. 4, p. 790-795, Feb. 15, 1988.
Ojeda-Castaneda, J., et al., "Annular apodizers for low sensitivity to defocus and to spherical aberration", Optics Letters, vol. 11, No. 8, p. 487-489, Aug. 1986.
Ojeda-Castaneda, J., et al., "Apodization of annular apertures: Strehl ratio", Applied Optics, vol. 27, No. 24, p. 5140-5145, Dec. 15, 1988.
Ojeda-Castaneda, J., et al., "High focal depth by apodization and digital restoration", Applied Optics, vol. 27, No. 12, p. 2583-2586, Jun. 15, 1988.
Ojeda-Castaneda, J., et al., "Spatial filter for increasing the depth of focus", Optics Letters, vol. 20, No. 11, p. 530-522, Nov. 1985.

O'Shea, D C. & Harrigan, M.E., "Chapter 33, Aberration Curves in Lens Design", Handbook of Optics, vol. 1, 1995, pp. 33.1-33.5 McGraw-Hill, New York.

Pieper, R.J. & Korpel, A. "Image processing for extended depth of field", Applied Optics, vol. 22, No. 10, p. 1449-1453, May 15, 1983.

Poon, Ting-Chung & Motamedi, M., "Optical/digital incoherent image processing for extended depth of field", Applied Optics, vol. 26, No. 21, Nov. 1, 1987, pp. 4612-4615.

International Search Report PCT/US96/01514, publication No. WO 96/24085, entitled, "Extended Depth of Field Optical Systems," May 20, 1996; 2 pages.

Schmitt, J.M. et al., "An optical coherence microscope with enhanced resolving power in thick tissue", Optics Communications, vol. 142, p. 203-207, Oct. 15, 1997.

Shatalin, S.V., et al. "Polarization contrast imaging of thin films in scanning microscopy", Optics Communications, vol. 116, p. 291-299, May 1, 1995.

Sherif, S.S. "A logarithmic phase filter to extend the depth of field of incoherent hybrid imaging systems", Applied Optics, in press.

Sirat, G.Y. "Conoscopic holography, I. Basic principles and physical basis", J. Opt. Soc. Am. A, vol. 9, No. 1, p. 70-90, Jan. 1992.

Tucker, S.C. et al. "Extended depth of field and aberration control for inexpensive digital microscope systems", Optics Express, vol. 4, No. 11, p. 467-474, May 24, 1999.

Van Der Gracht, J. et al. "Broadband behavior of an optical-digital focus-invariant system", Optics Letters, vol. 21, No. 13, p. 919-921, Jul. 1, 1996.

Varamit, C. & Indebetouw G., "Imaging properties of defocused partitioned pupils", J. Opt. Soc. Am. A, vol. 2, No. 6, p. 799-802, Jun. 1985.

Veldkamp, W. et al. "Binary Optics", Scientific American, May 1, 1992, vol. 266, No. 5, pp. 50-55.

Wach, H.B., et al. "Control of chromatic focal shift through wavefront coding", Applied Optics, vol. 37, No. 23, p. 5359-5367, Aug. 10, 1998.

Wang, H. & Gan, F. "High focal depth with a pure-phase apodizer", Applied Optics, vol. 40, No. 31, p. 5658-5662, Nov. 1, 2001.

Wang, H. & Gan, F. "Phase-shifting apodizers for increasing focal depth", Applied Optics, vol. 41, No. 25, p. 5263-5268, Sep. 1, 2002.

Wei, H. and Binnie, T.D. "High-resolution image reconstruction for multiple low-resolution images", 7th International Conference on Image Processing and Its Applications, Pub. # 465, vol. 2 p. 596-600 (1999).

Welford, W.T. "Use of annular apertures to increase focal depth", Journal of the Optical Society of America, vol. 50, No. 8, p. 749-753, Aug. 1960.

Wust, C. & Capson, D.W., "Surface profile measurement using color fringe projection", Machine Vision and Applications, vol. 4, p. 193-203, 1991.

Van Der Gracht, J. et al. "Aspheric optical elements for extended depth of field imaging," SPIE, 1995, pp. 279-288, vol. 2537.

Bradburn, S., et al., Realizations of focus invariance in optical-digital systems with wave-front coding, Applied Optics, vol. 36, No. 35, Dec. 10, 1997, pp. 9157-9166.

WAVEFRONT CODED IMAGING SYSTEMS

CROSS-REFERENCE TO RELATED APPLICATIONS

This patent application is a continuation of commonly-owned and U.S. patent application Ser. No. 11/192,572, filed 29 Jul. 2005, now U.S. Pat. No. 7,106,510, which is a continuation of U.S. patent application Ser. No. 10/407,708, filed Apr. 4, 2003, now U.S. Pat. No. 6,940,649, which is a continuation of U.S. patent application Ser. No. 09/747,788, now abandoned, filed Dec. 22, 2000. This patent application is also a continuation-in-part of commonly-owned and U.S. patent application Ser. No. 09/070,969, filed May 1, 1998, now U.S. Pat. No. 7,218,448, which is a continuation-in-part of U.S. patent application Ser. No. 08/823,894, filed Mar. 17, 1997, now U.S. Pat. No. 5,748,371, issued May 5, 1998, which is a continuation of U.S. patent application Ser. No. 08/384,257, filed Feb. 3, 1995, now abandoned. Each of the above-mentioned patents and patent applications are incorporated herein by reference. U.S. patent application Ser. No. 09/875,435, filed Jun. 6, 2001, now U.S. Pat. No. 6,525,302, U.S. patent application Ser. No. 09/875,766, filed Jun. 6, 2001, and U.S. patent application Ser. No. 09/766,325 filed Jan. 19, 2001, now U.S. Pat. No. 6,873,733, issued Mar. 29, 2005 are each incorporated herein by reference.

BACKGROUND

Traditional optical design is based on the premise that the only major components of the imaging system are the optics and detector. The detector can be analog (e.g. film) or a digital detector (e.g., CCD, CMOS, etc.). Traditional image processing techniques performed on an image are performed after the image is formed. Examples of traditional image processing include edge sharpening and color filter array (CFA) color interpolation. Traditional optics are therefore designed to form images at the detector that are sharp and clear over a range of field angles, illumination wavelengths, temperatures, and focus positions. Consequently, a trade off is made between forming good images, which requires optical designs that are larger, heavier, and contain more optical elements than are desirable, and modifying the design in order to reduce size, weight, or the number of optical elements, which results in loss of image quality.

A need remains in the art for improved optical designs which produce good images with systems that are smaller, lighter, and contain fewer elements than those based on traditional optics.

SUMMARY

Optical design based on Wavefront Coding enables systems such that they can be smaller, lighter, and contain fewer optical elements than those based on traditional optics. Wavefront Coding systems share the task of image formation between optics and digital processing. Instead of the imaging system being primarily composed of optics and the detector, Wavefront Coding imaging systems are composed of optics, the detector, and processing of the detected image. The detector can in general be analog, such as film, or a digital detector. Since processing of the detected image is an integral part of the total system, the optics of Wavefront Coded imaging systems do not need to form sharp and clear images at the plane of the detector. It is only the images after processing that need to be sharp and clear.

Wavefront Coding, in general, corrects for known or unknown amounts of "misfocus-like" aberrations. These aberrations include misfocus, spherical aberration, petzval curvature, astigmatism, and chromatic aberration. System sensitivities to environmental parameters such as temperature and pressure induced aberrations, and mechanical focus related aberrations from fabrication error, assembly error, drift, wear, etc., are also reduced with Wavefront Coding. Optical designs based on Wavefront Coding can reduce the effects of these aberrations and result in simpler designs that produce good images.

Optical system designs according to the present invention are improved in that they have the characteristic that the transverse ray intercept curves are substantially straight lines. Unlike traditional optical designs, the transverse ray intercept curves for wavefront coded systems need not have a near zero slope; the slope, which indicates misfocus, may be substantial, because wavefront coding allows the effects due to misfocus to be removed. In actual systems, the transverse ray intercept curves should vary mainly in slope over wavelength, field angles, temperature, etc., but need not be exactly straight lines; some ripple is acceptable. With wavefront coding optical surfaces and post processing, good images can be produced.

In one embodiment, a singlet imaging system for imaging an object onto a detector includes a lens configured for producing transverse ray intercept curves which are substantially straight, sloped lines. A wavefront coding element is formed on a surface of the lens and configured such that a modulation transfer function of the lens and wavefront coding element, combined, exhibits reduced variation, over a range of spatial frequencies and caused, at least in part, by aberrations of the lens, as compared to a modulation transfer function of the lens alone, without the wavefront coding element. A post processor is configured for generating an improved modulation transfer function, over the range of spatial frequencies, as compared to the modulation transfer function of the lens and the wavefront coding element.

Another embodiment is an improved imaging system for imaging an object onto a detector, the imaging system including a lens configured for producing transverse ray intercept curves that are substantially straight, sloped lines. The improvement includes a wavefront coding element formed on a surface of the lens and configured such that a modulation transfer function of the lens and the wavefront coding element, combined, exhibits reduced variation, over a range of spatial frequencies and caused, at least in part, by aberrations of the lens, as compared to a modulation transfer function of the lens alone, without the wavefront coding element. The improvement also includes a post-processor configured for generating an improved modulation transfer function, over the range of spatial frequencies, as compared to the modulation transfer function of a combination of the lens and the wavefront coding element.

BRIEF DESCRIPTION OF THE DRAWINGS

FIG. 15b shows MTFs for the system of FIG. 15a.

DETAILED DESCRIPTION OF THE DRAWINGS

Figure 1:
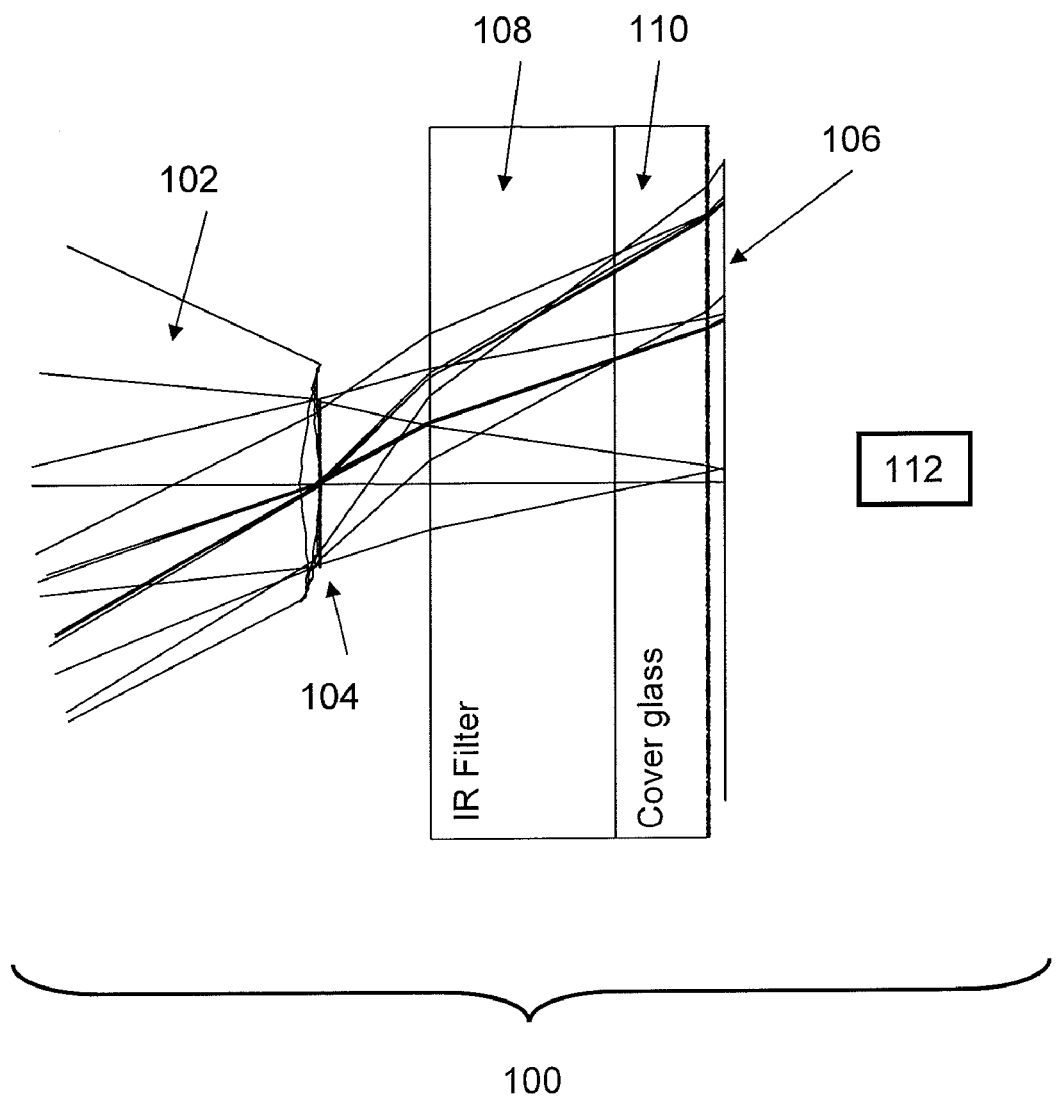
FIG. 1 shows a single-lens miniature imaging system according to the present invention.

FIG. 1 shows a single-lens miniature imaging system 100 according to the present invention. Lens 102 includes wavefront coding element 104 formed on its second surface. Detector 106 is preceded by an infrared (IR) filter 108 and cover glass 110. Post processing filter 112 performs processing on the images captured by detector 106.

The examplary single-lens imaging system (singlet) 100 is designed to meet the following specifications:
f=2.5 mm
F/#=2.6
Length<4.5 mm
Material: Polymethylmethacrylate (PMMA)
FOV=50°
Focus: ∞–30 cm
pixel size=6 µm
Bayer CFA/100% fill factor
MTF>40% at 40 lp/mm.

The exemplary singlet 100, without Wavefront Coding element 104, was designed so that the aberrations that are not corrected by the optical surfaces, namely petzval curvature and axial chromatic aberration, are a type of misfocus. Specifically, petzval curvature is a type of misfocus with field angle, and axial chromatic aberration is misfocus with illumination wavelength. The effect of these aberrations could hypothetically be corrected within small regions of the image plane by changing the focus position. By adding a Wavefront Coding surface, the resulting MTFs and PSFs will be insensitive to the focus-like aberrations. However, the MTFs and PSFs will not be the same as an ideal in-focus MTF or PSF from a traditional imaging system. Image processing is required to restore the spatial character of the image and produce a sharp and clear image.

The form of the Wavefront Coding surface used in this example is $$S(x, y) = \sum a_i \, \text{sign}(x) \left|\frac{x}{r_n}\right|^{b_i} + a_i \, \text{sign}(y) \left|\frac{y}{r_n}\right|^{b_i}, \quad \text{(Eq. 1)}$$

where the sum is over the index i. Sign(x)=−1 for x<0, +1 for x≧0.

The parameter $r_n$ is a normalized radius value. This particular Wavefront Coding surface is rectangularly separable and allows for fast software processing. Other forms of Wavefront Coding surfaces are nonseparable and are the sum of rectangularly separable forms. One non-separable form is defined as:

$$S(r, \theta) = \Sigma \alpha_i r^{60\,i} \cos(b_i \theta + \phi_i), \quad \text{(Eq. 2)}$$

where the sum is again over the subscript i.

There are an infinite number of Wavefront Coding surface forms. The Wavefront Coding surface for singlet 100 in this example is placed at the stop surface (e.g., Wavefront Coding element 104) and has the parameterized equation:

$$S(x, y) = \sum a_i \, \text{sign}(x) \left|\frac{x}{r_n}\right|^{b_i} + a_i \, \text{sign}(y) \left|\frac{y}{r_n}\right|^{b_i} \quad \text{(Eq. 3)}$$

and the parameter values for i=1, 2, 3 are:
$a_1$=17.4171, $b_1$=2.9911
$a_2$=10.8895, $b_2$=6
$a_3$=3.8845, $b_3$=20.1909
$r_n$=0.459.

Figure 2:
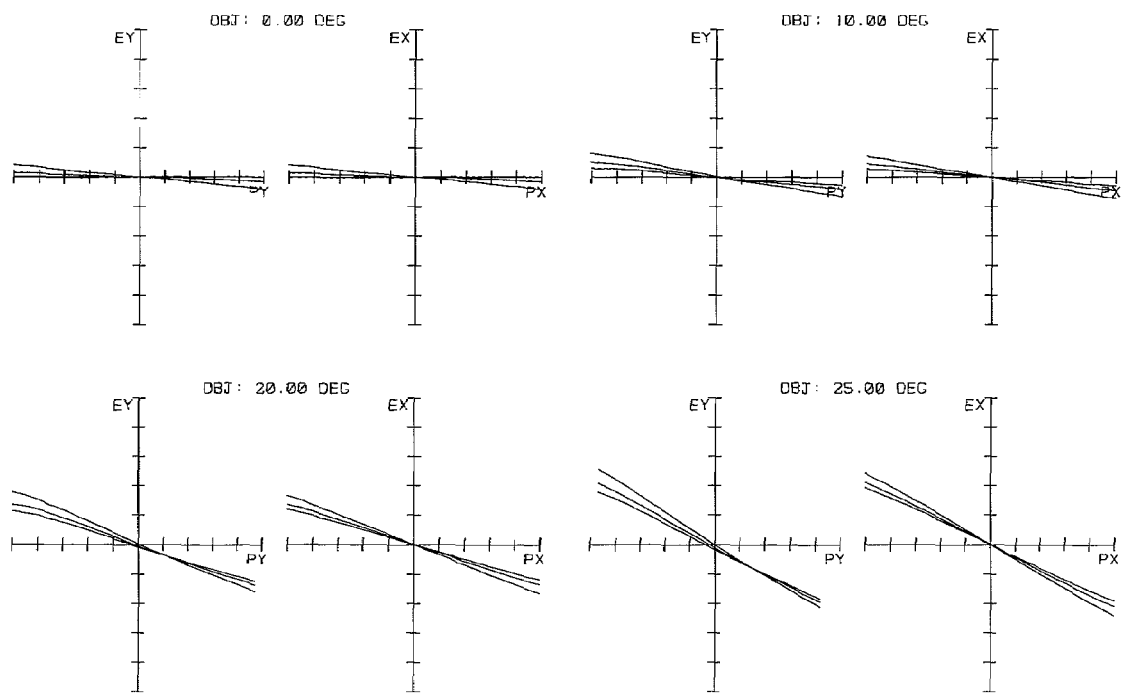
FIG. 2 illustrates a series of transverse ray intercept curves illustrating aberrations at various wavelengths for the system of FIG. 1 with wavefront coding removed.
Figure 3:
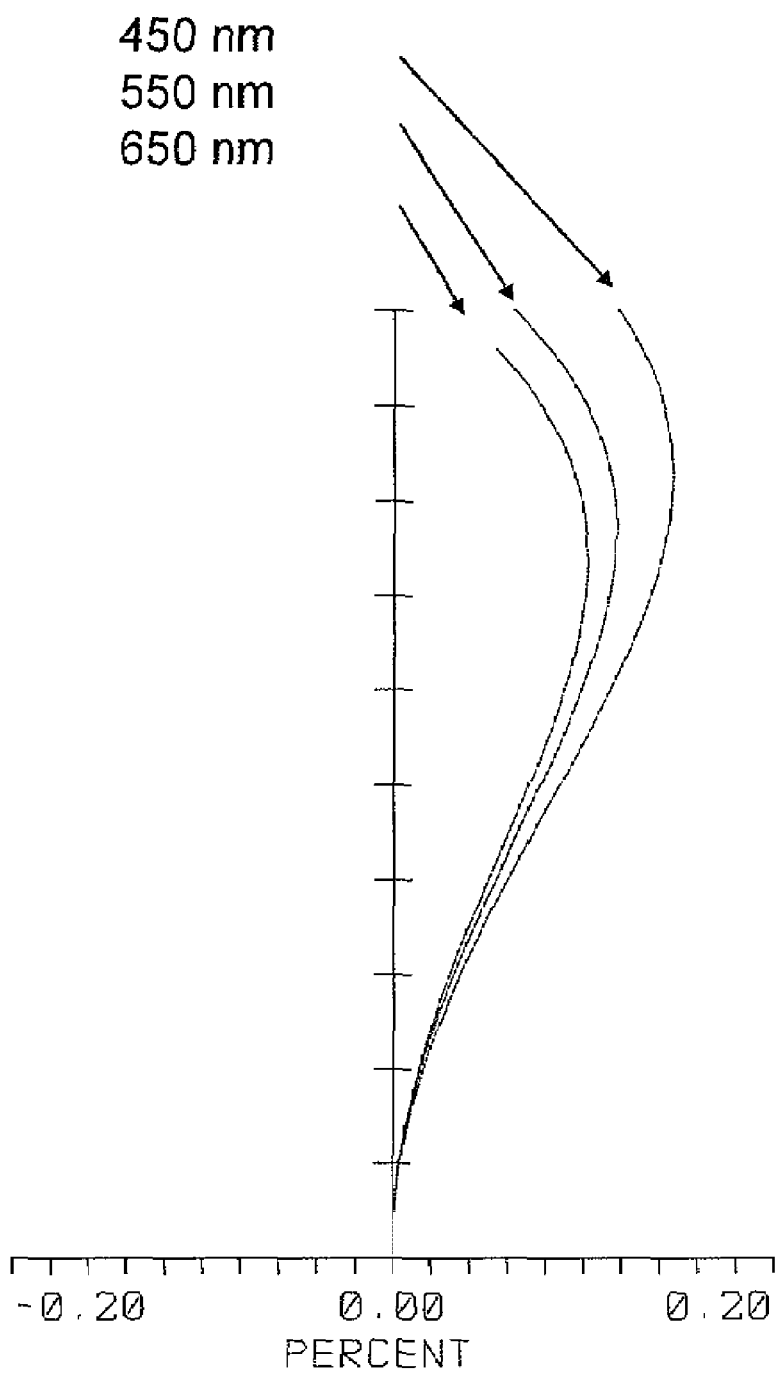
FIG. 3 illustrates distortion curves for the system of FIG. 1 with wavefront coding removed.
Figure 4:
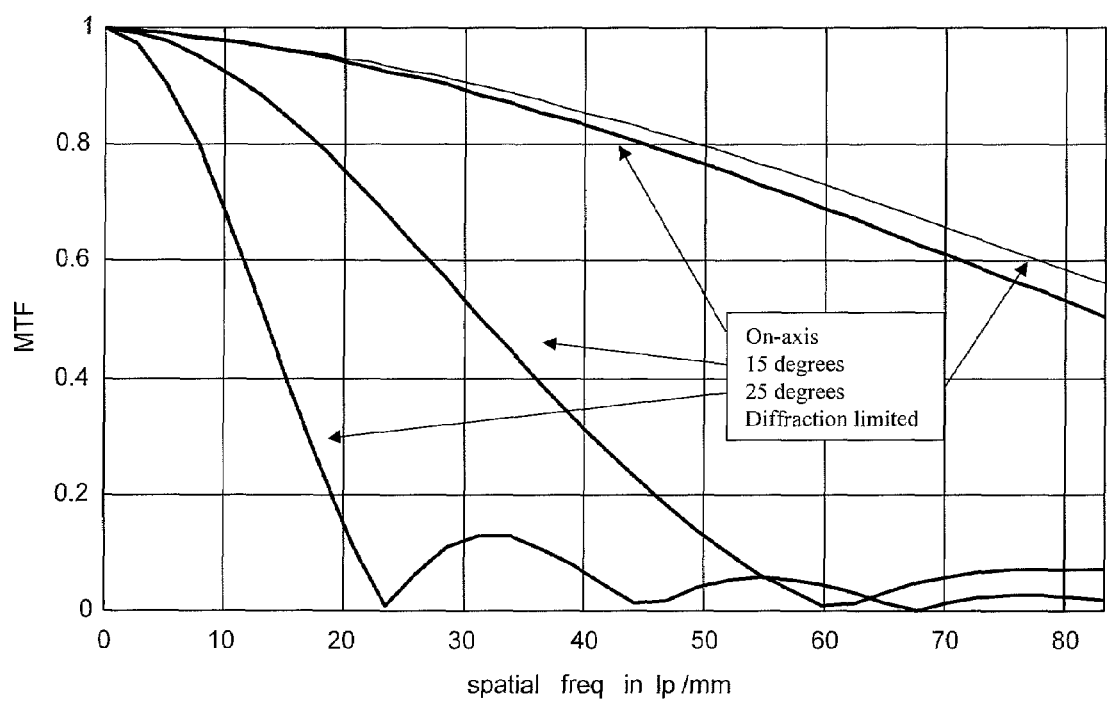
FIG. 4 illustrates modulation transfer functions (MTF) for the system of FIG. 1 with wavefront coding removed.
Figure 5:
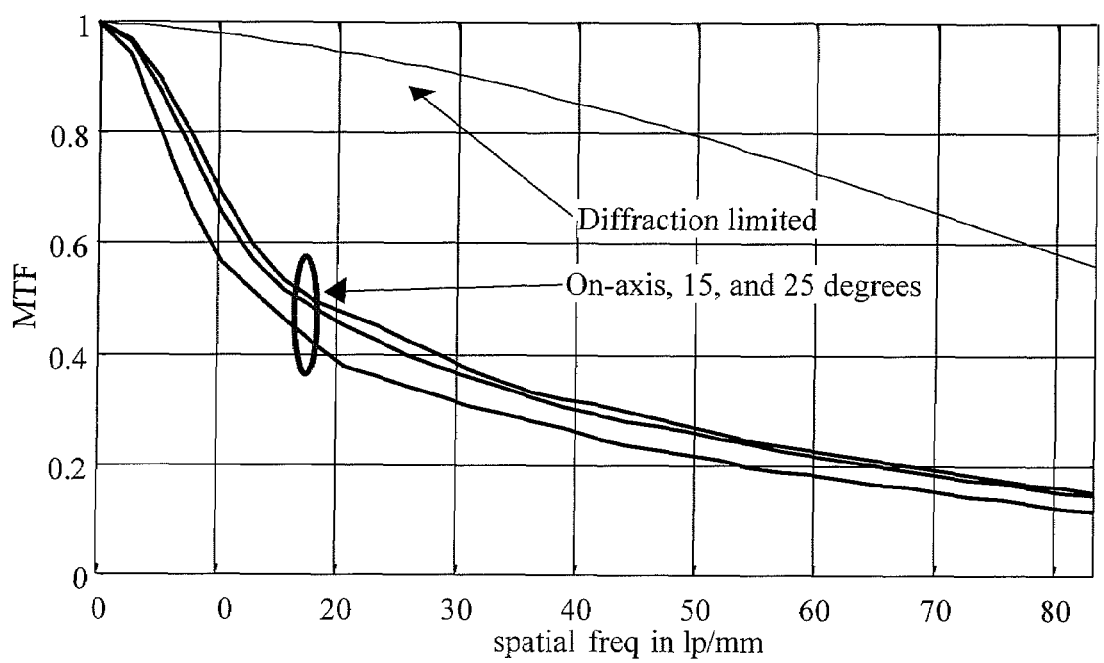
FIG. 5 illustrates MTFs for the system of FIG. 1 with wavefront coding, but without post processing.
Figure 6:
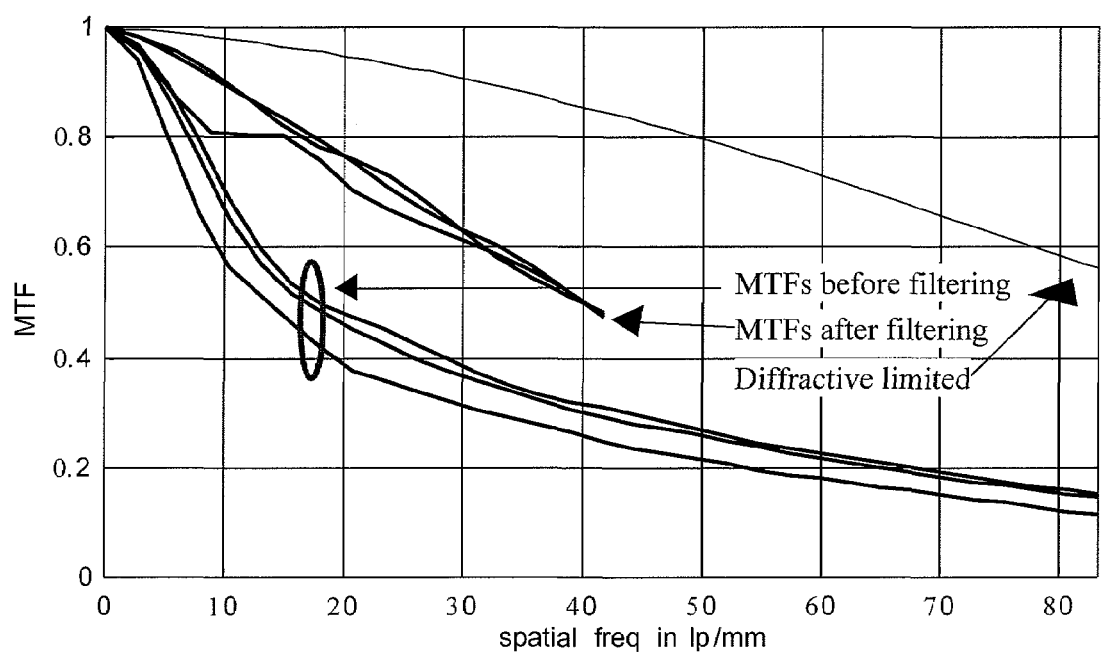
FIG. 6 illustrates MTFs for the system of FIG. 1 with wavefront coding, before and after filtering.
Figure 7:
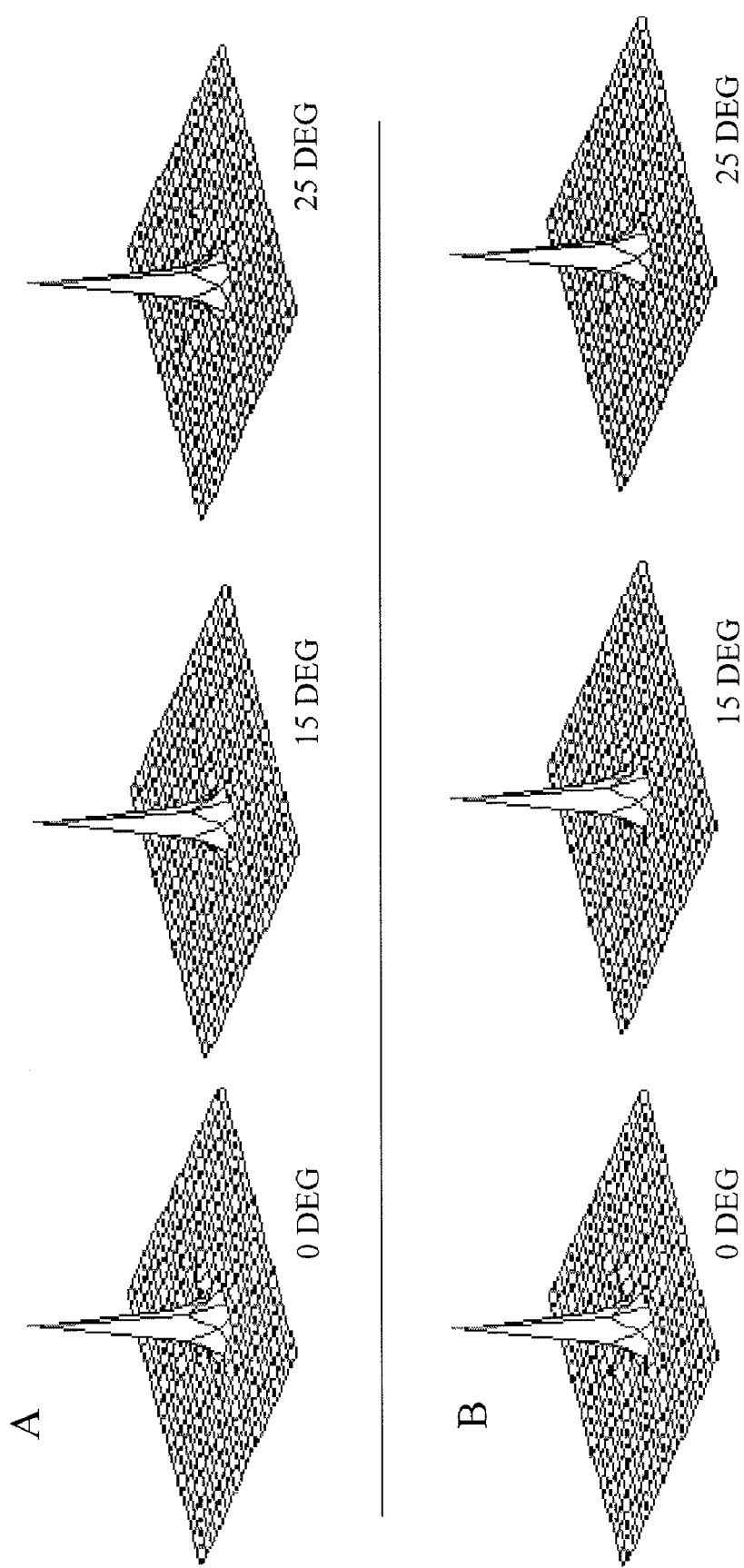
FIGS. 7a and 7b illustrate sampled point spread functions (PSF) for the system of FIG. 1 with wavefront coding and after filtering for two object distances.

FIGS. 2-4 illustrate the performance of system 100 with wavefront coding element 104 removed, in order to illustrate design requirements and performance. FIG. 5 illustrates the performance of system 100 with wavefront coding element 104 in place, but without post processing filter 112. FIG. 6 illustrates the performance improvement with post processing 112. FIGS. 7a and 7b show PSFs for system 100 with both wavefront coding and post processing.

FIG. 2 illustrates a series of transverse ray intercept curves illustrating aberrations at various wavelengths, for the system of FIG. 1 with wavefront coding element 104 removed for illustrative purposes. Curves are shown for system 100 at half field angles of 0°, 10°, 20° and 25° off axis, and for illumination wavelengths of 450 nm, 550 nm, and 650 nm. A slope of zero indicates an in-focus condition. Thus on-axis rays are nearly in focus. But, for off axis field angles, the slopes of the transverse ray intercept curves increase dramatically.

There are numerous traditional methods of designing lenses. Most methods try to balance aberrations in order to improve the off-axis imaging at the expense of on-axis imaging or system simplicity. Traditional design methodologies do not attempt to make the transverse ray intercept curves straight lines. Instead, the traditional goal is to try to minimize the distance of a substantial portion of the transverse ray intercept curves from the horizontal axis. In most traditional systems the ray intercept curves are very different from straight lines, but in general lie closer to the horizontal axis than the off-axis curves shown in FIG. 2. In other words, in traditional systems the variation from a straight horizontal line is mainly in the straightness of the line, rather than in its slope.

Figure 15A:
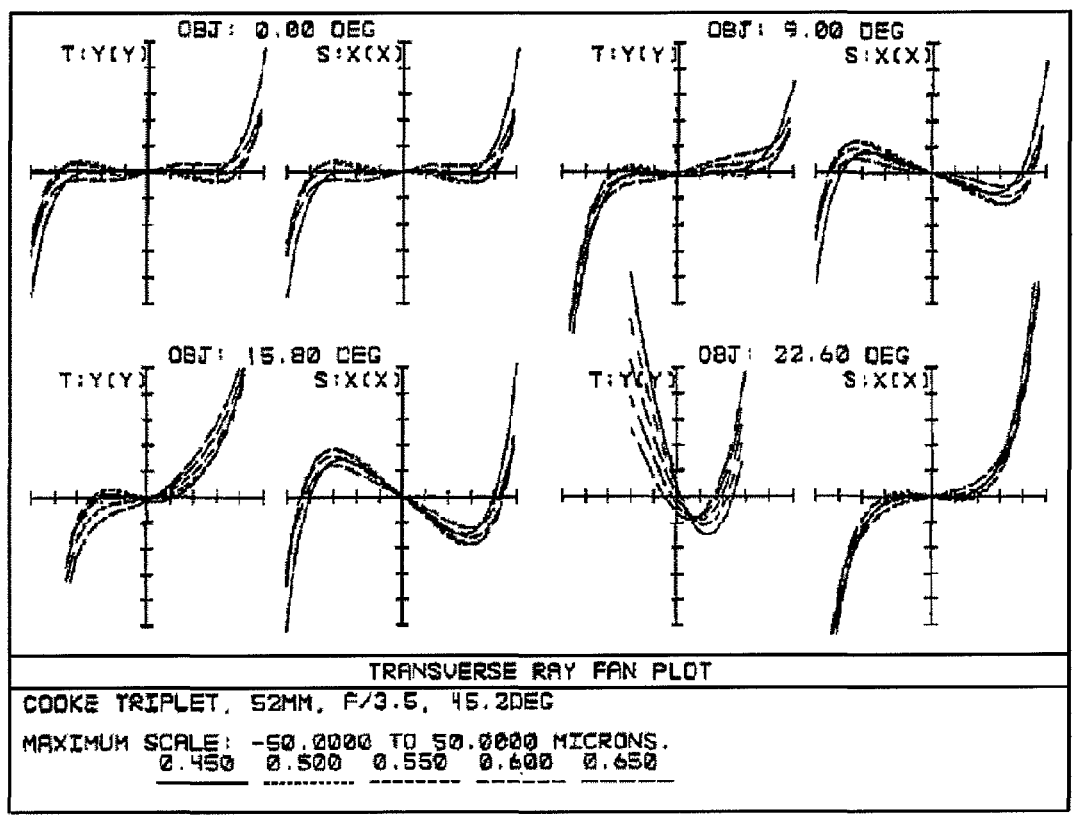
FIG. 15a illustrates transverse ray intercept curves as typically implemented in traditional imaging systems.
Figure 15B:
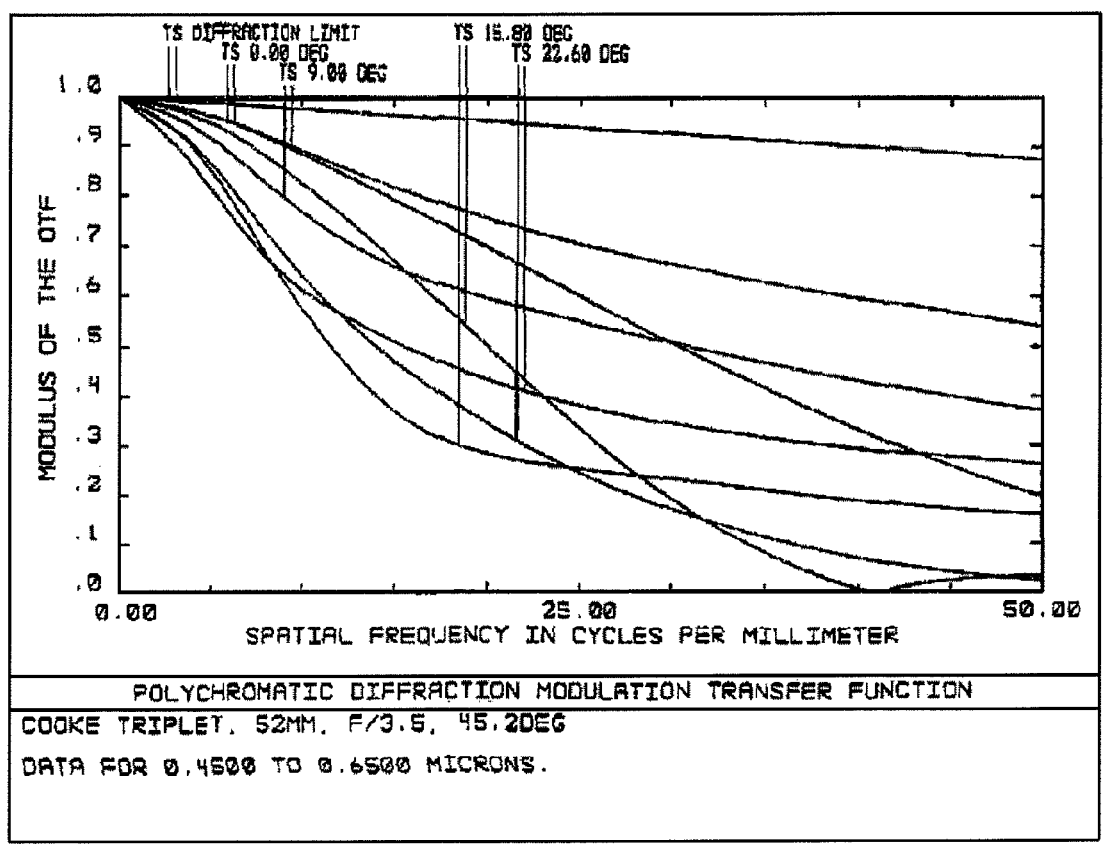

FIG. 15a (prior art) illustrates traditional transverse ray plots. These plots are taken from "Practical Computer Aided Lens Design", Gregory Hallick Smith, William Bell, Inc., Richmond 1998. Note that the plot for near on axis rays do look similar to straight horizontal lines, and thus produce an in focus image. Refer also to FIG. 15b which shows associated MTFs for this system. The MTFs for near on axis rays are good. But as the rays move further off axis, the plots in FIG. 15a quickly deviate from being straight lines. Their associated MTFs in 15b also quickly degrade.

The transverse ray intercept curves of FIG. 2 are essentially straight lines, both on and off axis. This is a deliberate design goal, because the use of wavefront coding element 104 and post processing filter 112 can bring the captured images into focus, so long as the curves without wavefront coding are essentially straight lines through the origin, even if the lines are significantly sloped. The effect of the slope is removed by adding wavefront coding and post processing.

The aberration petzval curvature gives rise to transverse ray intercept curves, with slopes that are a function of field angle. Axial chromatic aberration gives rise to ray intercept curves with slopes that are a function of illumination wavelength. From FIG. 2, both of these features are part of the transverse ray intercept curves in this examplary design.

FIG. 3 illustrates distortion curves for system 100 of FIG. 1, with wavefront coding element 104 removed. The distortion is less than 0.2%. If distortion was large enough then additional digital processing might be required to reposition image points into a non-distorted image. Table 1 lists the optical prescription of this lens, again without the Wavefront Coding surface. Units are in mm, and the total length is 4.1 mm. Aspheric terms describe rotationally symmetric forms of $r^{order}$ with order equal to 4, 6, 8, etc.

TABLE 1

| Surface | Radius | Thickness | Material | Diameter |
|---------|--------|-----------|----------|----------|
| Obj | Inf | Inf | | 0 |
| 1 | 2.077 | 1.7133 | PMMA | 2 |
| Stop | −2.236 | 0.6498 | | 1.4 |
| 3 | Inf | 1.1 | BK7 | 3.4 |
| 4 | Inf | 0.55 | BK7 | 3.4 |
| Img | | 0.1 | | 3.4 |

| Surface | Conic | 4th Asph. | 6th Asph. | 8th Asph. |
|---------|-------|-----------|-----------|-----------|
| Obj | 0 | | | |
| 1 | −1.299 | −.000375 | −.010932 | −.00603 |
| Stop | −3.140 | −.01049 | | |
| 3 | 0 | | | |
| 4 | 0 | | | |
| Img | | | | |

FIG. 4 illustrates MTFs for system 100 of FIG. 1, without wavefront coding element 104. These MTFs correspond to the transverse ray aberration curves of FIG. 2. The MTFs are for half field angles 0, 15, and 25 degrees with wavelengths of 550 nm. The MTFs include the pixel MTF due to the Bayer color filter array detector with six micron pixels and 100% fill factor. The on-axis MTF is essentially diffraction limited. The large drop in MTF off-axis is due to the large amount of petzval curvature that is unavoidable in traditional single lens designs with a large field of view. This singlet without wavefront coding 104 does not meet the MTF specification of greater than 40% modulation at 40 lp/mm for all field angles. But, due to its design for Wavefront Coding, modifying the second surface with a Wavefront Coding surface on element 104 will lead to acceptable MTF modulation values when combined with digital processing. By changing the wavefront coding element 104 either more or less sensitivity to misfocus aberrations can be formed.

FIG. 5 illustrates MTFs for system 100 of FIG. 1 with wavefront coding element 104 in place but without post processing filter 112. The system is focused at infinity. The half field angles shown are 0, 15, and 25 degrees. The wavelength is 550 nm. These MTFs have very little variation with field angle due to the addition of the Wavefront Coding surface, as compared to FIG. 4. Pixel MTF due to the Bayer CFA has again been included. The Bayer CFA with 6 μm 100% fill factor pixels has a Nyquist spatial frequency of about 42 lp/mm. Note that there are purposely no zeros in the MTFs below the detector's Nyquist spatial frequency.

FIG. 6 illustrates MTFs for system 100 of FIG. 1, with wavefront coding element 104 and after processing filter 112. Applying a single digital filter in processing block 112 gives the optical/digital MTFs shown in FIG. 6. The MTFs before filtering are as shown in FIG. 5. The MTFs after processing filter 112 at the spatial frequency of 40 lp/mm are all above 40% as specified by the design specifications. The level of the MTFs after processing could further be increased beyond that of the traditional diffraction-limited case, but possibly at the expense of a lower signal to noise ratio of the final image.

FIGS. 7a and 7b illustrate sampled two-dimensional PSFs for system 100 of FIG. 1, with wavefront coding element 104 and after processing filter 112. FIG. 7a shows the processed PSFs when the object is at infinity. FIG. 7b shows the processed PSFs when the object is at 30 cm. These PSFs are for 550 nm wavelength and half field angles of 0, 15, and 25 degrees. After filtering, these PSFs have nearly ideal shapes. This singlet 100 when combined with wavefront coding and digital filtering thus easily meets the system specifications.

In one preferred embodiment, processing filter 112 is a rectangularly separable digital filter. Rectangularly separable filters are more computationally efficient (counting the number of multiplications and additions) than full 2D kernel filters. Separable filtering consists of filtering each row of the image with the 1D row filter and forming an intermediate image. The columns of the intermediate image are then filtered with the 1D column filter to provide the final in-focus image. The separable filter used for this exemplary singlet has the same filters for rows and columns.

Figure 16:
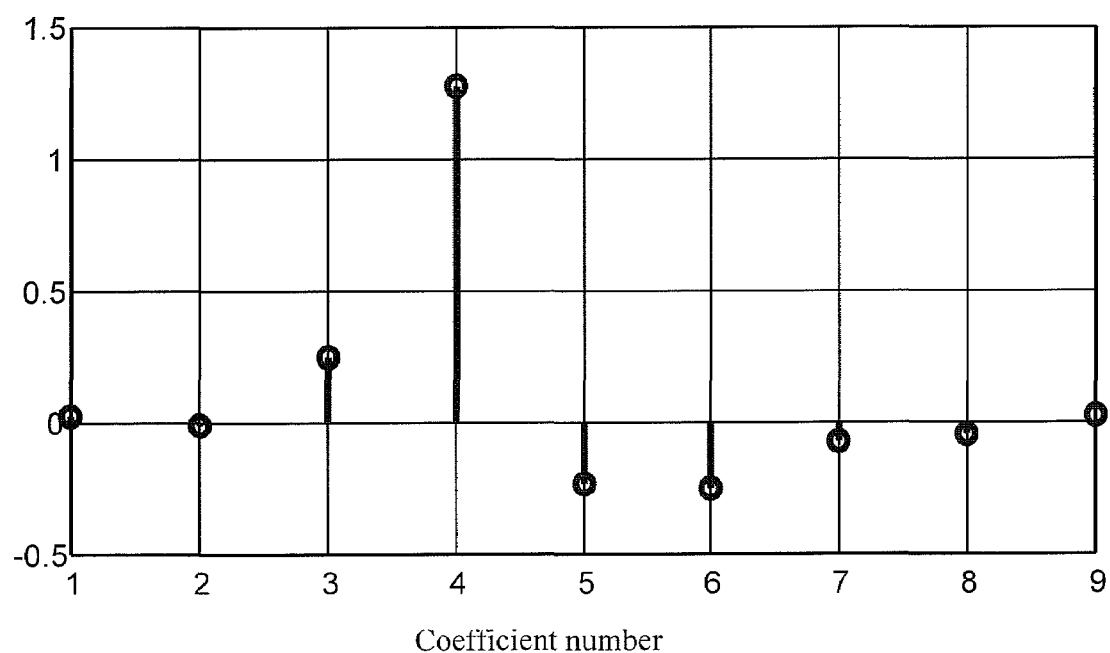
FIG. 16 illustrates an example of a one dimensional separable filter for use as a post processing element in the present invention.
Figure 17:
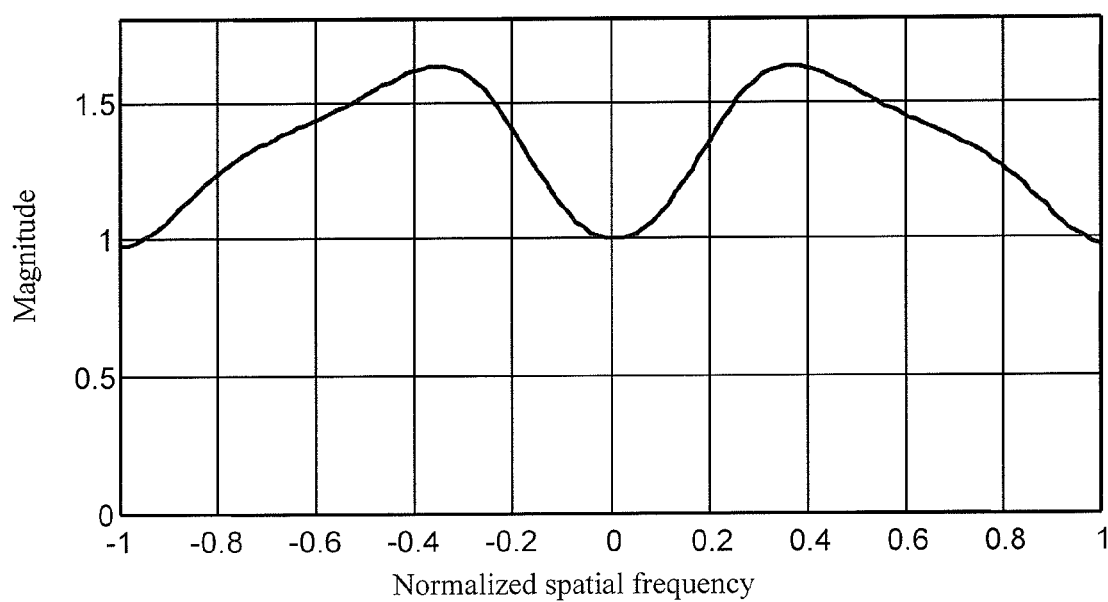
FIG. 17 illustrates the magnitude of the transfer function of the filter of FIG. 16.

FIG. 16 illustrates an example of a one dimensional separable filter as used as processing filter 112. Coefficients are represented as real values, but can be quantified into integer values for fixed point computations. The sum of the filter coefficients equals approximately 1. The coefficients were determined with a least squares algorithm by minimizing the squared difference between the filtered wavefront coded optical transfer functions (OTF) and a desired MTF with a value greater than 40% at 40 lp/mm. The width of the filtered PSFs of FIGS. 7a and 7b are also minimized with the least squares algorithm. Changes in the filtered PSFs are minimized in regions away from their central peaks. FIG. 17 illustrates the magnitude of the transfer function of the filter of FIG. 16. The zero spatial frequency value is 1.

Wavefront coding microscope objective 800 is designed to meet the following objectives:
  magnification=10×
  N.A.=0.15
  Distortion<1%
  7 micron square pixels with 100% fill factor
  VGA grayscale detector
  Optical material: PMMA.

The depth of field of traditional microscope objectives is described by the numerical aperture (NA) and the imaging wavelength. The wavefront coding objective can have a depth of field that is independent of the NA of the objective. The depth of field can be large enough to introduce prospective distortion to the final images. Regions of the object that are farther from the objective will appear smaller than regions of the object closer to the objective. Both near and far regions can image clearly with a large depth of field. Since the depth of field of traditional objectives is small, prospective distortion is not common with traditional objectives, especially with high NA. Prospective distortion can be reduced or eliminated by designing wavefront coding objectives that are telecentric. In telecentric imaging systems the magnification of the object is independent of the distance to the object.

Figure 8:
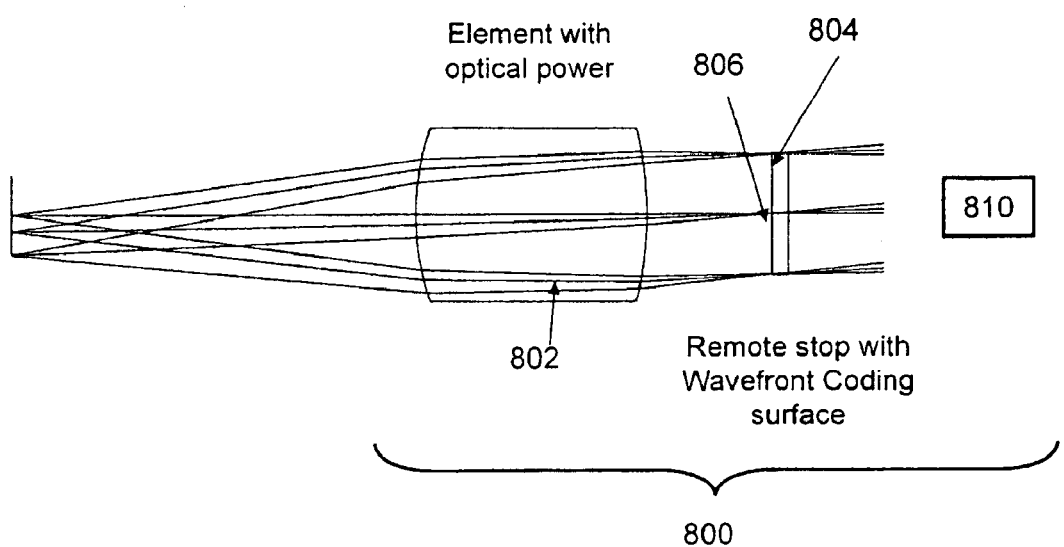
FIG. 8 shows a low cost microscope objective according to the present invention.
Figure 9:
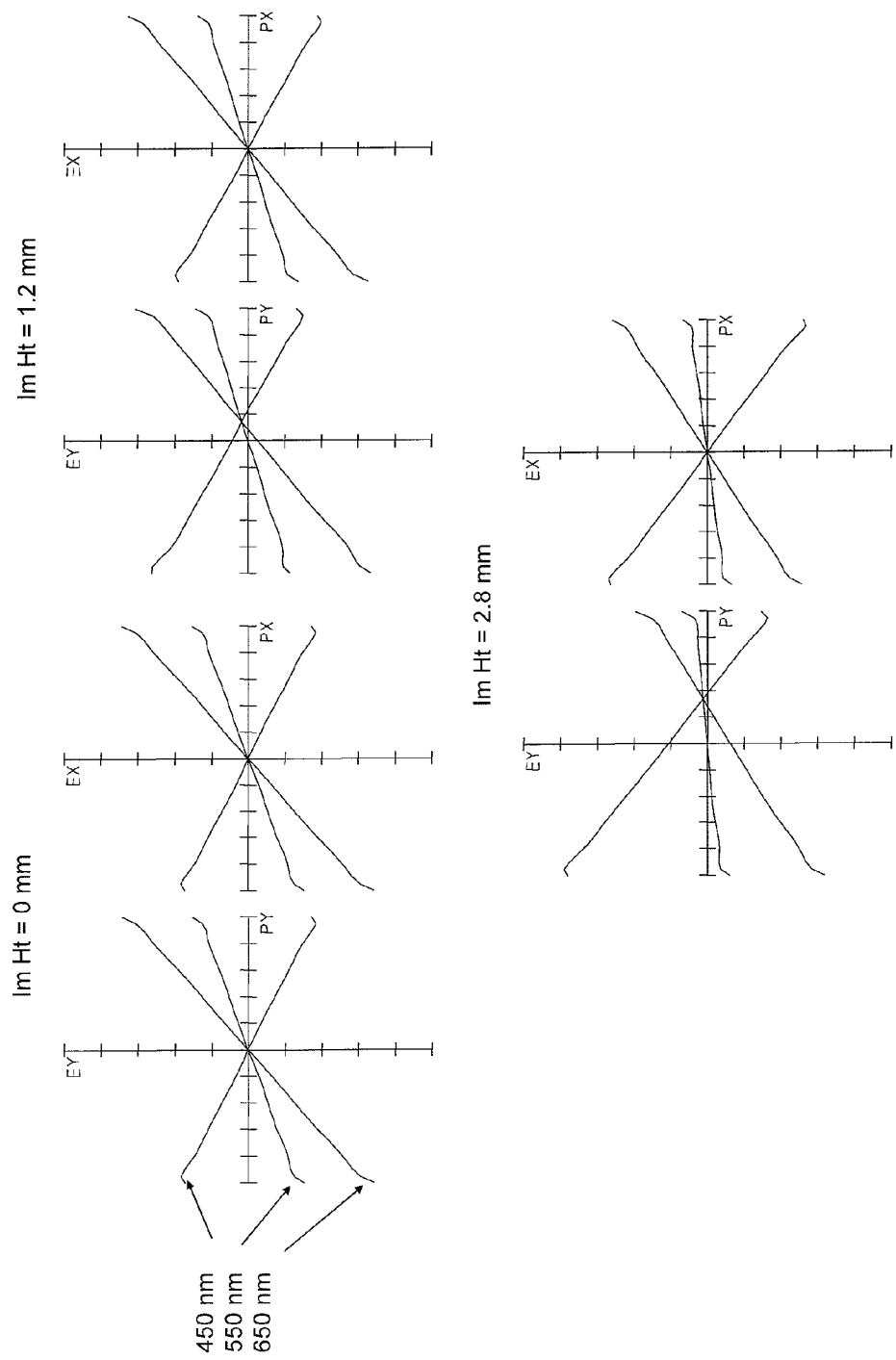
FIG. 9 illustrates a series of transverse ray intercept curves illustrating aberrations at various wavelengths for the system of FIG. 8 with wavefront coding removed.

FIG. 9 illustrates a series of transverse ray intercept curves illustrating aberrations at various wavelengths, for system 800 of FIG. 8, with wavefront coding element 806 removed. The ray intercept curves of FIG. 9 describe the performance of the system at wavelengths 450 nm, 550 nm and 650 nm for the image field heights of on-axis 0.0 mm, 1.2 mm and 2.8 mm. Full scale is +/−100 microns. Notice that each of these ray intercept curves vary mainly in slope, as required by the present invention (e.g., the shape of the curves are essentially the same when the slope components of the curves are not considered). While these plots are not quite as close to perfectly straight lines as those in FIG. 2, they can still be considered to be sloped substantially straight lines.

The major aberration apparent in this design is axial chromatic aberration, with a smaller amount of petzval curvature and lateral chromatic aberration. Without Wavefront Coding this lens would image poorly in white light, although it might produce a reasonable image in a single color. Tables 2 and 3 give the optical prescription for this system. Table 3 gives rotationally symmetric aspheric terms for the system.

TABLE 2

| Surface | Radius of curv | Thickness | Material | Diameter | Conic |
|---|---|---|---|---|---|
| Obj | Inf | 2.45906 | | 0.6357861 | 0 |
| 1 | 1.973107 | 1.415926 | Acrylic | 1.2 | −1.680295 |
| 2 | −2.882275 | 0.7648311 | | 1.2 | −1.029351 |
| Stop | Inf | 0.1 | Acrylic | 0.841 | 0 |
| 4 | Inf | 25.83517 | | 0.841 | 0 |
| Img | | | | 6.173922 | |

TABLE 3

| Surface | 4th | 6th | 8th | 10th | 12th | 14th |
|---|---|---|---|---|---|---|
| 1 | 0.013191 | −0.22886 | 0.139609 | −0.250285 | −0.18807 | 0.193763 |
| 2 | −0.008797 | 0.017236 | 0.007808 | −0.223224 | 0.160689 | −0.274339 |
| Stop | −0.018549 | −0.010249 | −0.303999 | 1.369745 | 11.245778 | −59.7839958 |

Wavefront coding element 806 is placed at aperture stop 804, and is given by the rectangularly separable form of:

$$S(x, y) = \sum a_i \operatorname{sign}(x)\left|\frac{x}{r_n}\right|^{b_i} + a_i \operatorname{sign}(y)\left|\frac{y}{r_n}\right|^{b_i}, \quad (\text{Eq. 4})$$

and the parameter values for i=1, 2 are:
$a_1$=1.486852, $b_1$=3.0
$a_2$=3.221235, $b_2$=10.0
$r_n$=0.419.

Figure 10:
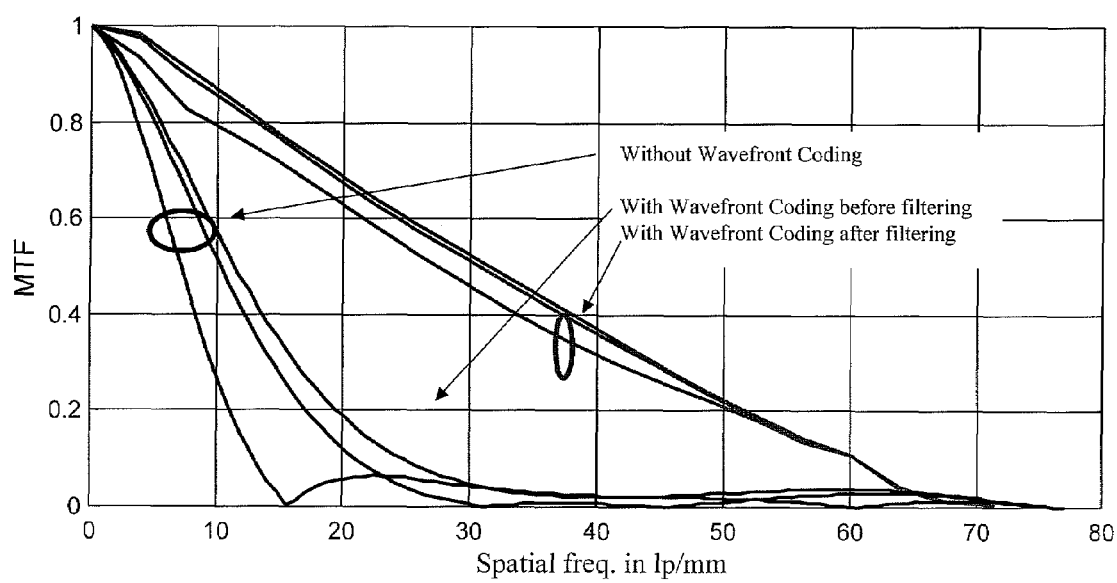
FIG. 10 illustrates MTFs for the system of FIG. 8 with wavefront coding, without wavefront coding, and with wavefront coding and filtering.

FIG. 10 illustrates MTFs for system 800 of FIG. 8 with wavefront coding, without wavefront coding, and with both wavefront coding and post processing filtering, for illumination at 450 nm. Image field heights are 0.0 mm, 1.2 mm and 2.8 mm.

Figure 11:
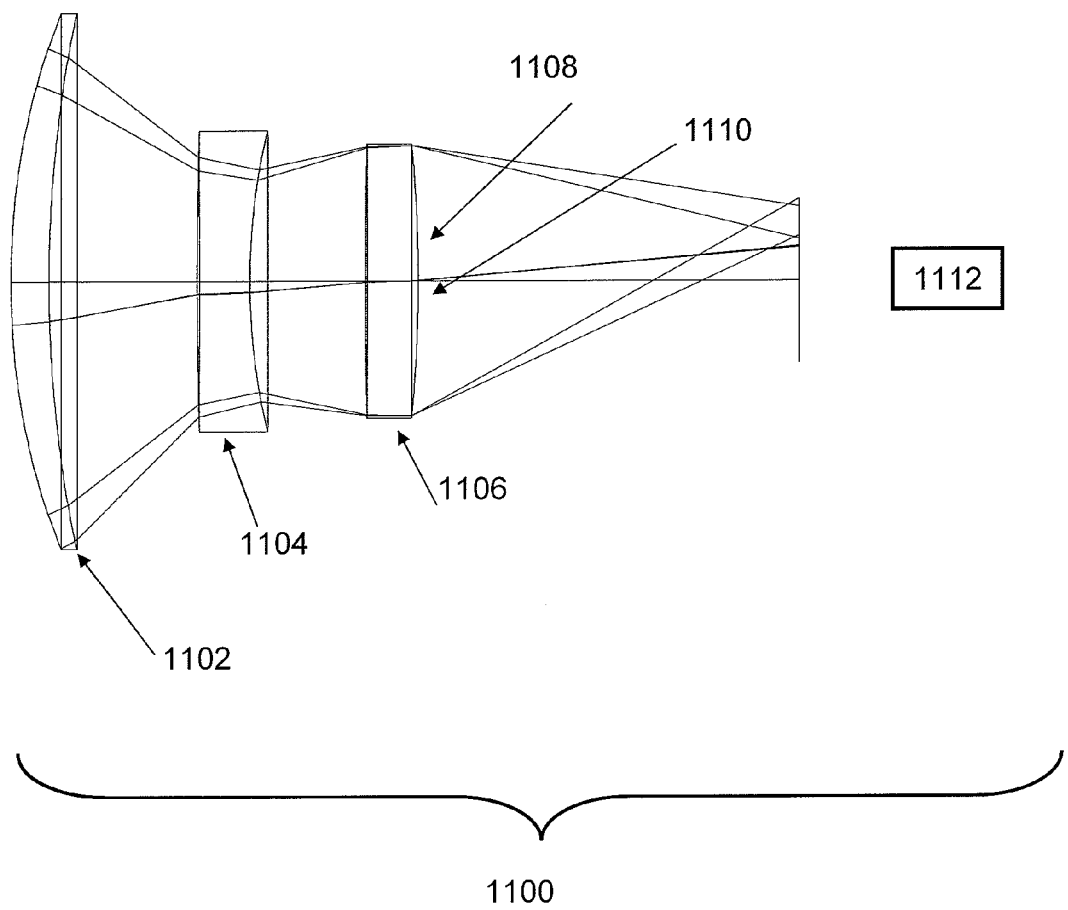
FIG. 11 shows a passive athermalized IR imaging system according to the present invention.

FIG. 11 shows a passive athermalized IR imaging system 1100 according to the present invention. Lens 1102 is composed of silicon. Lens 1104 is composed of germanium. Lens 1106 is composed of silicon. The aperture stop 1108 is at the back surface of lens 1106. Wavefront coding surface 1110 is on the back surface of lens 1106 (at aperture stop 1108). Processing block 1112 processes the image.

Design goals are as follows:

F/2 f=100 mm 3 deg half field of view

Illumination wavelength=10 microns 20 micron square pixels, 100% fill factor

Silicon & germanium optics

Aluminum mounts

Temperature range of −20° C. to +70° C.

Combined constraints of low F/#, inexpensive mounting material, and wide operating temperature make this design very difficult for traditional optics. Table 4 gives the optical prescription of system 1100.

TABLE 4

| Surface | Radius of curv | Thickness | Material | Diameter | Conic |
|---|---|---|---|---|---|
| Obj | Inf | Inf | | 0.6357861 | 0 |
| 1 | 58.6656 | 5.707297 | Silicon | 60 | 0 |
| 2 | 100.9934 | 22.39862 | | 57.6 | 0 |
| 3 | 447.046 | 8.000028 | Germanium | 32.4 | 0 |
| 4 | 50.88434 | 17.54754 | | 32.4 | 0 |
| 5 | 455.597 | 7.999977 | Silicon | 29.5 | 0 |
| Stop | −115.6064 | 57.9967 | | 29.5 | 0 |
| Img | | | | 6.173922 | |

The Wavefront Coding surface for IR system 100 of this example has the parameterized equation:

$$S(x, y) = \sum a_i \operatorname{sign}(x)\left|\frac{x}{r_n}\right|^{b_i} + a_i \operatorname{sign}(y)\left|\frac{y}{r_n}\right|^{b_i}, \quad (\text{Eq. 5})$$

and the parameter values for i=1, 2 are:
$a_1$=16.196742, $b_1$=3.172720
$a_2$=−311.005659, $b_2$=20.033486
$r_n$=18.314428.

Figure 12:
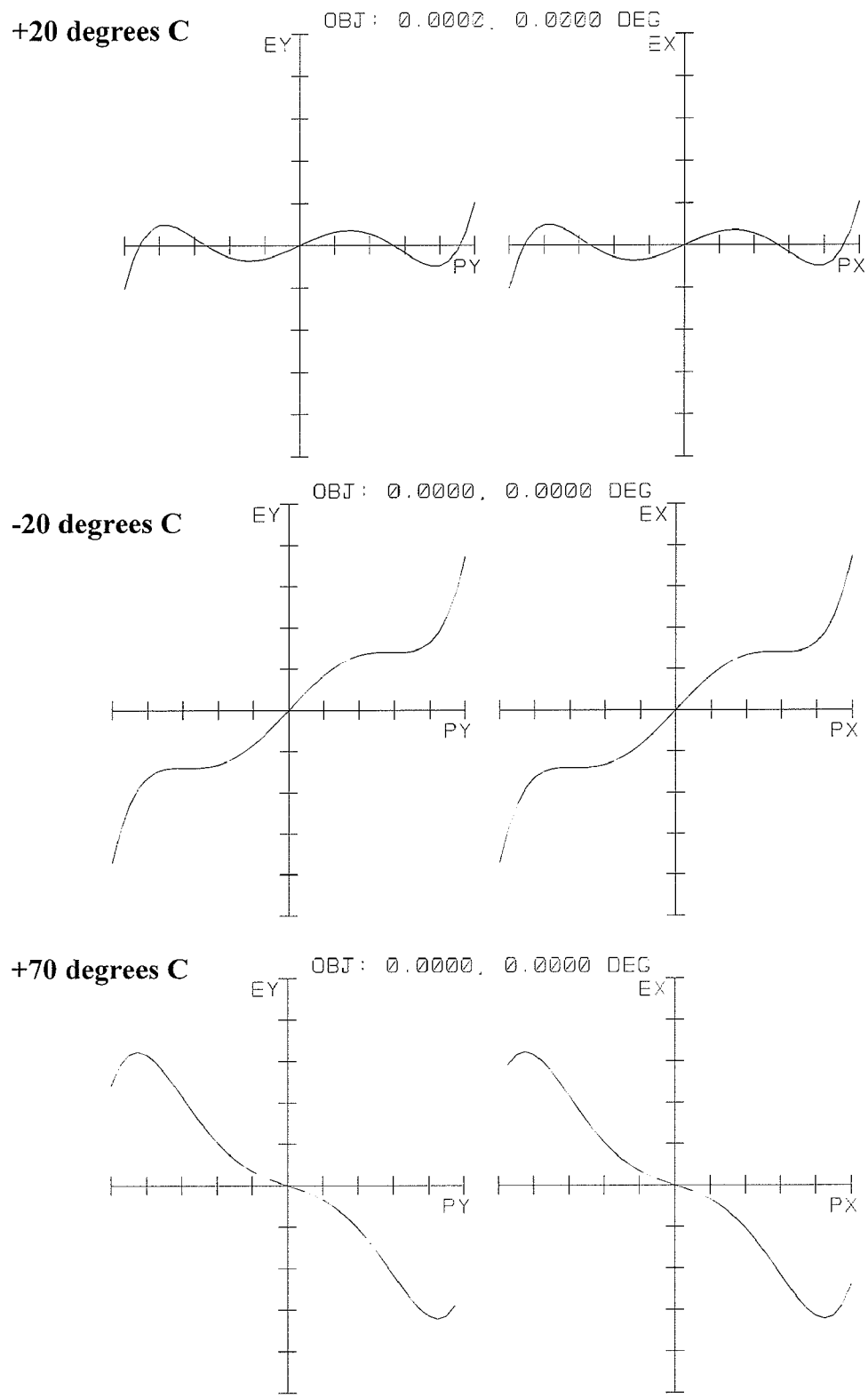
FIG. 12 illustrates a series of transverse ray intercept curves illustrating aberrations at various wavelengths for the system of FIG. 11 without wavefront coding.

FIG. 12 illustrates a series of transverse ray intercept curves illustrating aberrations at various wavelengths, for system 1100 of FIG. 11, with wavefront coding element 1110 removed. The ray intercept curves of FIG. 11 describe the performance of system 1100 at a wavelength of 10 microns, on axis field points for ambient temperatures of +20° C., −20° C., and +70° C. Full scale is +/−100 microns. Again these plots can be considered to be substantially straight lines. While they have more "wiggle" than the plots of FIGS. 2 and 9, in each case, if the plot were fitted to the closest straight line, the wiggles would not stray far from the line.

Figure 13:
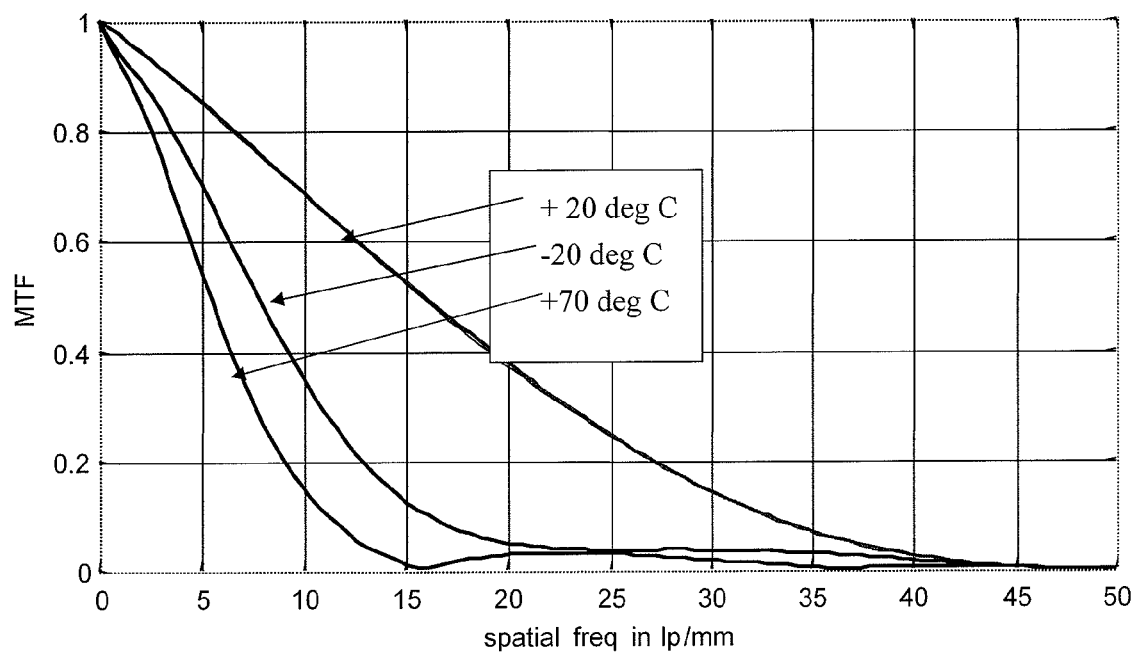
FIG. 13 illustrates MTFs for the system of FIG. 11 without wavefront coding.

FIG. 13 illustrates on-axis MTF curves for system 1100 without wavefront coding at three temperatures (+20°, −20° and +70°). Performance is nearly diffraction limited at +20°, but drops dramatically with changes in temperature.

Figure 14:
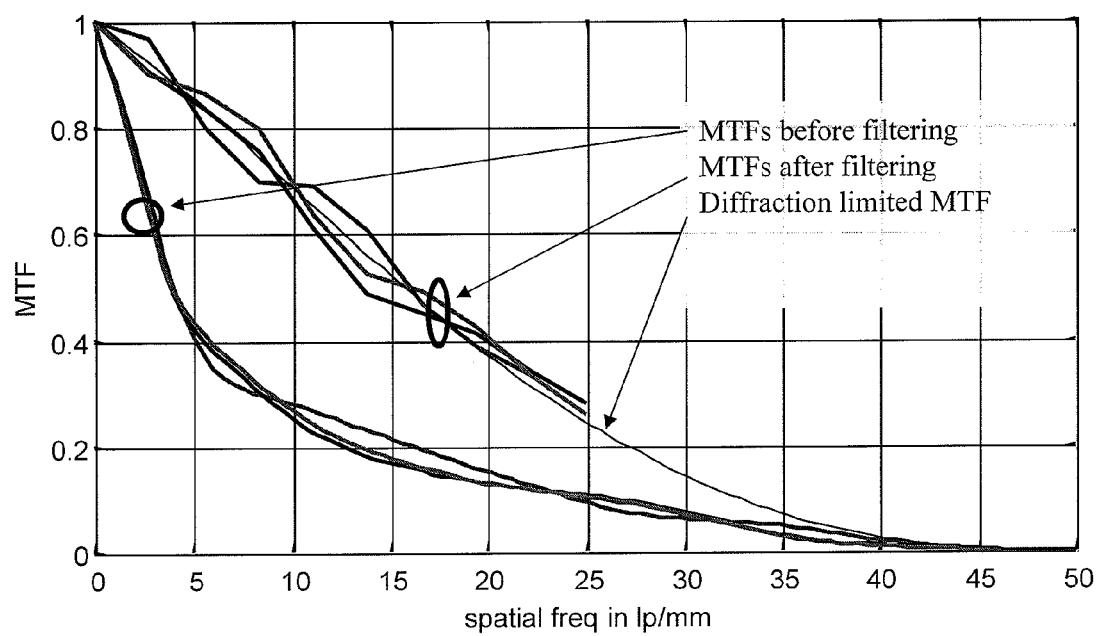
FIG. 14 illustrates MTFs for the system of FIG. 11 with wavefront coding, with and without filtering.

FIG. 14 illustrates MTFs for system 1100 of FIG. 11, with wavefront coding, both with and without filtering by processing block 1112. The illumination wavelength is 10 microns. The MTFs without filtering are significantly different from diffraction limited MTFs, but vary little with temperature. Thus, processing block 1112 is able to correct the images. The MTFs after filtering are near diffraction limited for all three temperatures (+20°, −20° and +70°). Filtered MTFs extend only to the Nyquist frequency of the 20 micron detector, or 25 lp/mm.

One preferred way to define what constitutes a transverse ray intercept curve that is a "substantially straight line" is to look at the MTFs over the entire useful range of the system with wavefront coding applied. These curves must be very close to each other, in order for the post processing to be able to move all MTFs to the desired performance level. Compare the MTFs of FIG. 4 (e.g., no wavefront coding) to those of FIG. 5 (e.g., wavefront coding). The FIG. 5 MTF curves are very close together. In FIG. 6, post processing has moved the MTFs to an acceptable level. More sophisticated post processing could improve the MTFs much further, to nearly diffraction limited performance, so long as the preprocessing curves are close enough together. Post processing could not accomplish this goal with the curves of FIG. 4, because they are not close together.

FIG. 10 also illustrates this concept. The MTF curves without wavefront coding do not track each other. The curves with wavefront coding are close together. Thus, the curves with wavefront coding after post processing are very good.

In FIGS. 13 and 14, the MTF curves without wavefront coding (e.g., FIG. 13) are far apart, but the MTF curves with wavefront coding (e.g., FIG. 14) are close enough together that the post processing curves are nearly diffraction limited.

In FIG. 13, it can be seen that the on-axis MTF (at +20° C., meaning essentially no temperature related misfocus) is essentially diffraction limited. This is the best case traditional MTF for this system. The MTFs at other temperatures, though, have greatly reduced performance due to temperature related effects.

Now consider the upper set of MTFs of FIG. 14, with wavefront coding and after processing. The MTFs are nearly identical. Thus the associated transverse ray intercept curves can be considered to be substantially straight lines, since they are close enough to straight to give essentially ideal MTFs.

For other systems, a lower level of performance may be acceptable, and consequently the deviation of the transverse ray intercept curves from a straight line may be larger. Such a situation would result if a fast lens (say F/2) is used with a digital detector, with, for example, 10 micron pixels. In 500 nm illumination, the diffraction limited MTF for the optical system would extend to 1000 lp/mm, but the highest spatial frequency that could be measured by the detector would be only 50 lp/mm. Thus, aberrations that alter the highest spatial frequencies of the optics are of no consequence, because they will not be measured by the detector. Note that while the transverse ray intercept curves may have noticeable deviations from a straight line (corresponding to the higher spatial frequencies), the transverse ray intercept curves are still "substantially straight lines" according to our definition, because the MTFs with wavefront coding are close together. The MTFs under consideration are those that correspond to the useful range of the particular system being considered.

Compare the MTFs of FIGS. 6, 10, and 14 with wavefront coding (e.g., useful range MTFs for embodiments of the present invention) with the MTFs resulting from traditional design of FIG. 15b. These traditional MTFs are quite far apart, so post processing could never give adequate performance. These curves are generally 50% or more apart, whereas the wavefront coding curves in FIGS. 6, 10, and 14, are within an average of 20% of each other over the useful range of the system, and, in the case of FIG. 10, are within an average of 10% of each other over the useful range of the system.

The major aberration apparent in the design of FIG. 11 is temperature related misfocus. Without Wavefront Coding, this lens would image poorly over a range of temperatures.

What is claimed is:

1. A singlet imaging system for imaging an object onto a detector, comprising:
 a lens configured for producing transverse ray intercept curves which are substantially straight, sloped lines;
 a wavefront coding element formed on a surface of the lens and configured such that a modulation transfer function of the lens and wavefront coding element, combined, exhibits reduced variation, over a range of spatial frequencies and caused, at least in part, by aberrations of the lens, as compared to a modulation transfer function of the lens alone, without the wavefront coding element; and
 a post processor configured for generating an improved modulation transfer function, over the range of spatial frequencies, as compared to the modulation transfer function of the lens and the wavefront coding element.

2. The singlet imaging system of claim 1, wherein the post processor includes a digital filter.

3. The singlet imaging system of claim 2, wherein the digital filter includes a separable filter.

4. The singlet imaging system of claim 1, wherein the wavefront coding element is formed on a surface of the lens furthest from the object.

5. The singlet imaging system of claim 1, said lens including a front surface defining a lens length between said front surface and said detector, the lens length being less than 5 mm.

6. The singlet imaging system of claim 1, wherein the wavefront coding element forms one of a rectangularly separable surface, a non-separable surface, and a surface having a sum of rectangularly separable forms.

7. The singlet imaging system of claim 1, wherein the lens is configured to transmit in an infrared wavelength range, and wherein the aberrations include temperature induced misfocus aberrations.

8. The singlet imaging system of claim 1, wherein the wavefront coding element is formed on a surface of the lens nearest to the object.

9. The singlet imaging system of claim 1, wherein the wavefront coding element is further configured such that the modulation transfer function of the lens and wavefront coding element exhibits the reduced variation over a field of view of at least approximately fifty degrees.

10. The singlet imaging system of claim 1, wherein the lens provides a magnification greater than one, and wherein the aberrations include at least one of chromatic aberration, petzval curvature and field curvature.

11. In an imaging system for imaging an object onto a detector, the imaging system including a lens configured for producing transverse ray intercept curves that are substantially straight, sloped lines, an improvement comprising:

a wavefront coding element formed on a surface of the lens and configured such that a modulation transfer function of the lens and the wavefront coding element, combined, exhibits reduced variation, over a range of spatial frequencies and caused, at least in part, by aberrations of the lens, as compared to a modulation transfer function of the lens alone, without the wavefront coding element; and a post-processor configured for generating an improved modulation transfer function, over the range of spatial frequencies, as compared to the modulation transfer function of the lens and the wavefront coding element.

12. In the system of claim 11, the further improvement wherein the post processor includes a digital filter.

13. In the system of claim 12, the further improvement wherein the digital filter includes a separable filter.

14. In the system of claim 11, the further improvement wherein the wavefront coding element is fonned on a surface of the lens furthest from the object.

15. In the system of claim 11, the further improvement wherein the lens includes a front surface defining a lens length between the front surface and the detector, the lens length being less than 5 mm.

16. In the system of claim 11, the further improvement wherein the wavefront coding element includes a selected one of a rectangularly separable surface, a non-separable surface, and a surface having a sum of rectangularly separable forms.

17. In the system of claim 11, the further improvement wherein the wavefront coding element is further configured such that the modulation transfer function of the lens and the wavefront coding element, combined, exhibits the reduced variation over a field of view of at least approximately 50 degrees.

18. In the system of claim 11, the further improvement wherein the lens provides a magnification greater than one, and wherein the aberrations include at least one of chromatic aberration, petzval curvature and field curvature.

* * * * *